United States Patent
Su et al.

(10) Patent No.: US 7,990,828 B2
(45) Date of Patent: Aug. 2, 2011

(54) METHOD FOR CONTROLLING FOCUS ON LABEL SIDE

(75) Inventors: I-Bing Su, Taoyuan County (TW); Chi-Hsiang Kuo, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 0 days.

(21) Appl. No.: 12/824,241

(22) Filed: Jun. 28, 2010

(65) Prior Publication Data
US 2011/0002202 A1 Jan. 6, 2011

(30) Foreign Application Priority Data
Jul. 2, 2009 (TW) ............................... 98122533 A

(51) Int. Cl.
*G11B 7/00* (2006.01)

(52) U.S. Cl. .................................. 369/53.23; 369/44.25

(58) Field of Classification Search ............... 369/44.25, 369/44.26, 53.15, 53.22, 53.17, 53.23, 53.28, 369/53.12
See application file for complete search history.

(56) References Cited

U.S. PATENT DOCUMENTS

| | | | | |
|---|---|---|---|---|
| 7,120,100 B2 * | 10/2006 | Hung et al. | ................. | 369/53.15 |
| 7,636,285 B2 * | 12/2009 | Tokiwa | ....................... | 369/53.22 |
| 7,847,812 B2 * | 12/2010 | Wei et al. | ....................... | 347/246 |

* cited by examiner

*Primary Examiner* — Nabil Z Hindi
(74) *Attorney, Agent, or Firm* — Winston Hsu; Scott Margo

(57) ABSTRACT

A method for controlling focus on a label side of a light-scribe disc divides the label side into several zones, finds the maximum SBAD and the corresponding focus volt and spoke during focusing on each zone, approaches a primary focus volt level curve, compensates a predetermined volt to focus on the label side, checks the maximum SBAD and the corresponding focus volt and spoke between the primary focus volt level curve and the compensation volt on each zone, and approaches a calibrating focus volt level curve to reduce errors.

13 Claims, 7 Drawing Sheets

METHOD FOR CONTROLLING FOCUS ON LABEL SIDE

BACKGROUND OF THE INVENTION

1. Field of the Invention

The present invention relates to an optical disc drive, and more particularly, to a method of forming volt level control focus when an optical disc drive scribes a label on a label side of an optical disc.

2. Description of the Prior Art

A light-scribe disc is formed by putting a layer of paint on a label side of the disc, and utilizing a laser beam from an optical pickup head to focus on the label side such that the heat will cause changes on the label side to form a label pattern. Insufficient laser beam heat will not be able to cause effective change and will therefore smear the label pattern. This means that the optical pickup head is required to move with the rotating optical disc to focus on the label side, and thus the laser heat can be concentrated to derive a clear label pattern. However, the paint of the label side is not distributed as evenly as a data side of the optical disc, and the reflective characteristic of the label side is also not as good as the data side, so an effective focus error signal cannot be generated to focus on the label side.

Please refer to FIG. 1 and FIG. 2 simultaneously. FIG. 1 is a prior art method of controlling focus of a label side of a disc. FIG. 2 is a label side focus volt level of a prior art. As shown in FIG. 1, a conventional optical pickup head 1 drives a lens 3 to move upwards and downwards via an electromagnetic force generated by adjusting a voltage of an actuator 2, and projects a laser beam from the optical pickup head 1 upon a label side 5 of a rotating disc 4. The label side 5 thereby reflects the laser beam back to the optical pickup head 1 and the laser beam finally projects to the photodetector 6. The photodetector 6 includes four light receiving parts A, B, C, D, which are evenly divided for receiving reflected light in different zones, respectively, and the photodetector 6 thereby converts the received light into electronic signals of corresponding magnitude. An amplifier 7 adds and amplifies the electronic signals in the light receiving parts A, B, C, D to form a side beam added signal (SBAD) of a corresponding magnitude h. During the focusing process, the lens 3 moves upwards and downwards by a predetermined distance S. When the focus point gets close to the label side 5, the derived SBAD increases gradually, and when the focus point is exactly on the label side 5, the reflected light is at its peak and the SBAD has a maximum value. When the focus point is over the label side 5, the derived SBAD will decrease with a distance between the focus point and the label side 5.

As shown in FIG. 2, the label side 5 of the light-scribe disc 4 is divided into eight radial zones 9 via four hundred spokes 8 with fixed angles, each zone having a group containing 50 spokes. When the laser beam of the optical pickup head 1 is projected on the rotating disc 4 at a fixed radial 10, SBADs are recorded during the focusing process of moving the optical pickup head 1 by a predetermined distance S via a volt at each zone 9. Due to a limitation of the interval of zone 9, the limited moving distance S is set by the focus point being over the label side 5 of the disc 4. Therefore, during the focusing process of each zone 9, a maximum SBAD of the focus point over the label side 4 can be derived. By referring to the volts and the spokes 8 corresponding to the maximum SBADs of the eight zones 9, a focus volt level curve 11 can be approximated. By utilizing the focus volt level curve 11, a focus volt corresponding to the spoke 8 where the optical pickup head 1 is located can be derived. Although the derived focus volt is different from the actual focus volt, the lens 3 can be moved to approximately focus on the label side 5 without utilizing the focus error signal to scribe label patterns.

Please refer to FIG. 1 again. When some warps or deformation occurs, such as the dotted line 4' on the disc 4, during the process of focusing of each zone 9 with the predetermined distance S, the focus point cannot pass over a deformed label side 5'. In particular, when more zones are divided, the interval between zones grows smaller and the predetermined distance S becomes smaller, so the derived maximum SBAD does not indicate that the focus point is on the label side 5', leading to a larger error upon the approximated focus volt level curve 11. This error will make the focus point of scribing label patterns away from the label side 5' therefore resulting in a blurred label pattern, and degrading clarity of the label, even to a point of being unable to scribe the label pattern. Therefore, the control method of conventional focusing on a label side of a disc still has many problems to be solved.

SUMMARY OF THE INVENTION

One objective of the present invention is to provide a method of controlling focus on a label side of a disc via: a preliminary focus volt level curve, increasing or decreasing volt of a predetermined value, and comparing magnitudes of side beam added signals to compensate an error of the focus volt level.

Another objective of the present invention is to provide a method of controlling focus on a label side of a disc via: compensating an error of the focus volt level to divide a label side of a disc into more zones to derive a more accurate focus volt level.

Yet another objective of the present invention is to provide a method of controlling focus on a label side of a disc via: utilizing a threshold to check a maximum difference between side beam added signals of focus volt level curves to determine a proper focus volt level.

To achieve the aforementioned goals, the method of controlling focus on a label side of a light-scribe disc comprises: dividing a label side of the light-scribe disc into a predetermined number of sections; performing focus process for each section to find the maximum side beam added signal (SBAD) of each section; utilizing a focus volt and a spoke corresponding to the maximum SBAD derived from each section to approximate a preliminary focus volt level curve; compensating a predetermined volt for the preliminary focus volt level curve to form a compensated focus volt level curve and performing focus process of the label side to detect and record a SBAD; comparing the SBAD derived from the preliminary focus volt level curve and the SBAD derived from the compensated focus volt level curve in each section; and utilizing the focus volt and the spoke corresponding to the maximum SBAD derived previously to approximate a calibrated focus volt level curve.

A method of controlling focus on a label side of a light-scribe disc according to another embodiment of the present invention comprises: dividing a label side of the light-scribe disc into a predetermined number of sections; performing focus process for each section to detect and record the maximum SBAD of each section; utilizing a focus volt and a spoke corresponding to the maximum. SBAD derived from each section to approximate a preliminary focus volt level curve; checking whether a difference of maximum SBAD between each section is within a threshold; when the difference is not within the threshold, compensating a predetermined volt for the preliminary focus volt level curve to form a compensated focus volt level curve and performing focus process of the label side to detect and record a SBAD; and when the difference is within the threshold, setting the preliminary focus volt level curve as a calibrated focus volt level curve.

These and other objectives of the present invention will no doubt become obvious to those of ordinary skill in the art after reading the following detailed description of the preferred embodiment that is illustrated in the various figures and drawings.

DETAILED DESCRIPTION

To achieve the aforementioned goals, the methods adopted and the effects thereof are illustrated as follows with exemplary embodiments in accordance with figures.

Figure 1:
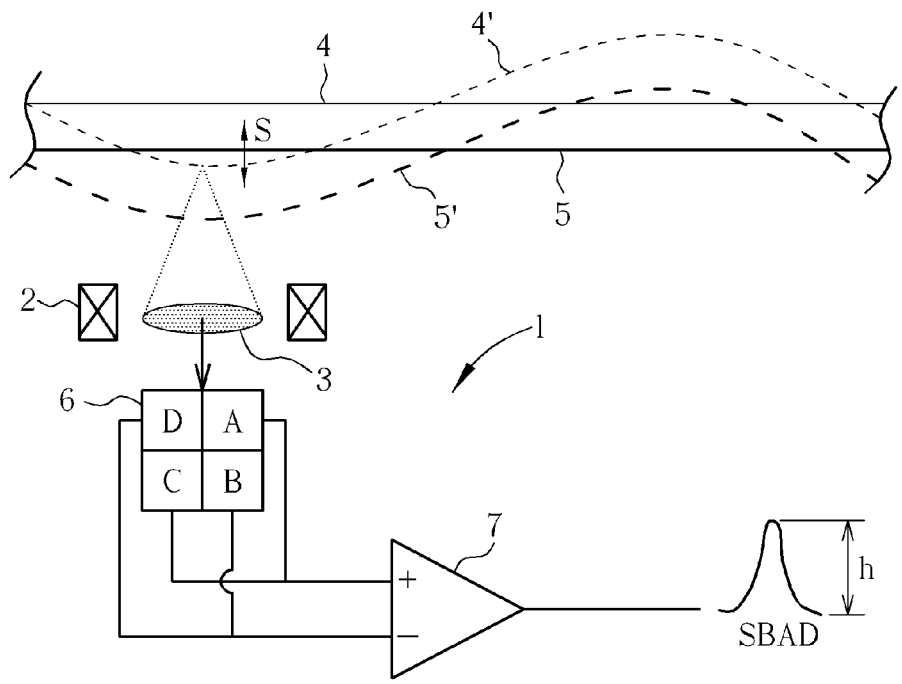
FIG. 1 is a method of controlling focus of a label side of a disc according to a prior art.
Figure 2:
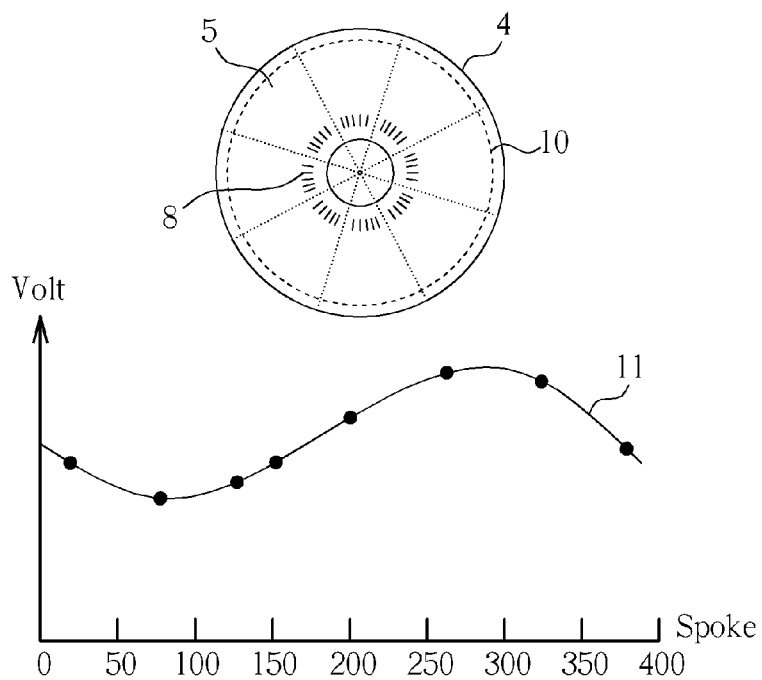
FIG. 2 is a label side focus volt level curve according to a prior art.
Figure 3:
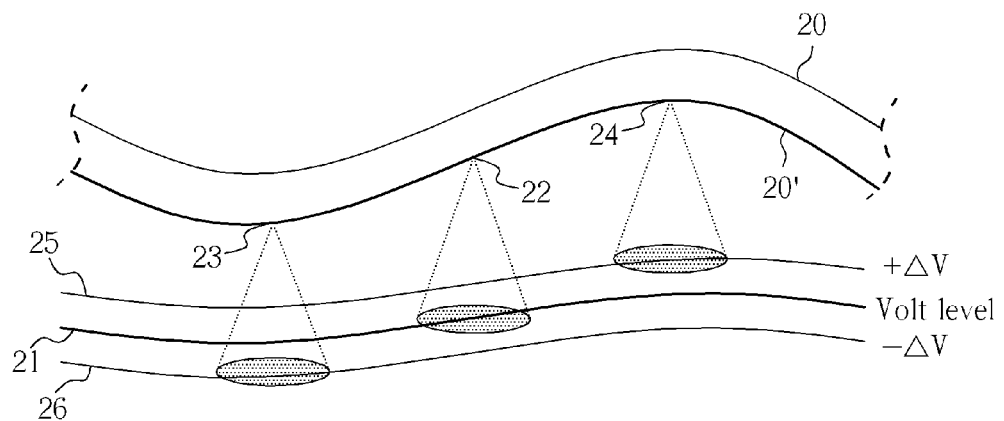
FIG. 3 is a diagram of compensating focus volt level according to a first embodiment of the present invention.
Figure 4:
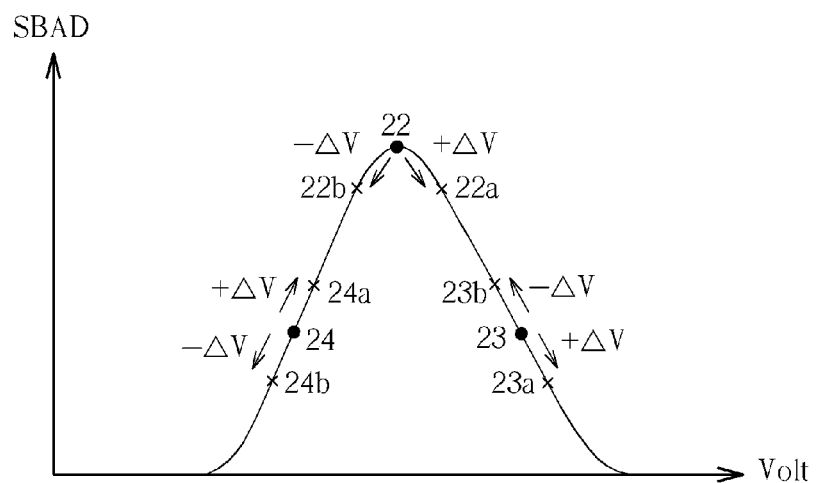
FIG. 4 is a diagram of a variation of side beam added signal during compensation according to a first embodiment of the present invention.

Please refer to FIG. 3 and FIG. 4 simultaneously. FIG. 3 is a diagram of compensating focus volt level according to a first embodiment of the present invention. FIG. 4 is a diagram of a variation of side beam added signal (SBAD) during compensation according to the first embodiment of the present invention. As shown in FIG. 3, four hundred spokes of a label side 20' of a light-scribe disc 20 are divided into several radial sections, e.g., twenty spokes as a section, with a total of twenty sections derived. As in the aforementioned prior art, during focus process of each section, SBADs are recorded, and referring to the volt magnitude and the spoke corresponding to the maximum SBAD during focus process of twenty sections, a preliminary focus volt level curve 21 is approximated. Although the preliminary focus volt level curve 21 is close to the shape of the label side 20', a predetermined distance for moving an optical pickup head during focus process is shortened due to increased number of sections. For a part 22 of disc 20 which has no deformation, the preliminary focus volt level curve 21 is still able to provide correct focus volt level. For a concave part 23 of the disc 20, the volt level from the preliminary focus volt level curve 21 will make the focus point over the label 20', and for a convex part 24 of the disc 20, the volt level from the preliminary focus volt level curve 21 will make the focus point insufficient to touch the label 20'. In both cases, the focus points cannot aim at the label side 20'.

The present invention utilizes the preliminary focus volt level curve 21, increasing a volt of a predetermined value ΔV to form a compensated plus focus volt level curve 25, or decreasing a volt of a predetermined value ΔV to form a compensated minus focus volt level curve 26. As shown in FIG. 4, for the part 22 without deformation, the compensated plus focus volt level curve 25 adds a volt of the predetermined value ΔV, lifting the focus point over the label side 20', so the SBAD will decrease to a compensated point 22a. The compensated minus focus volt level curve 26 minused by a volt of the predetermined value ΔV, pulling the focus point away from the label side 20', so the SBAD will decrease to a compensated point 22b. The preliminary focus volt level curve 21 can still maintain the focus point of the part 22 without deformation on the label side 20', and the SBADs are still the maximum.

For the concave part 23, the compensated plus focus volt level curve 25 adds a volt of the predetermined value ΔV, lifting the focus point away from the label side 20', so the SBAD will decrease to a compensated point 23a instead of the point 23. The compensated minus focus volt level curve 26 minuses a volt of the predetermined value ΔV, pulling the focus point close to the label side 20', so the SBAD will increase to a compensated point 23b instead of the point 23. Therefore, the maximum SBAD of the concave part 23 is changed. Likewise, for the convex part 24, subtract the compensated minus focus volt level curve 26 from a volt of the predetermined value ΔV, pushing the focus point away from the label side 20', so the SBAD will decrease to a compensated point 24b instead of the point 24. The compensated plus focus volt level curve 25 added a volt of the predetermined value ΔV, lifting the focus point close to the label side 20', so the SBAD will increase to a compensated point 24a instead of the point 24. Therefore, the maximum SBAD of the concave part 24 is changed. Therefore, the focus point will be more close to the label side 20' due to the new SBADs of the concave part 23 and the convex part 24.

Figure 5:
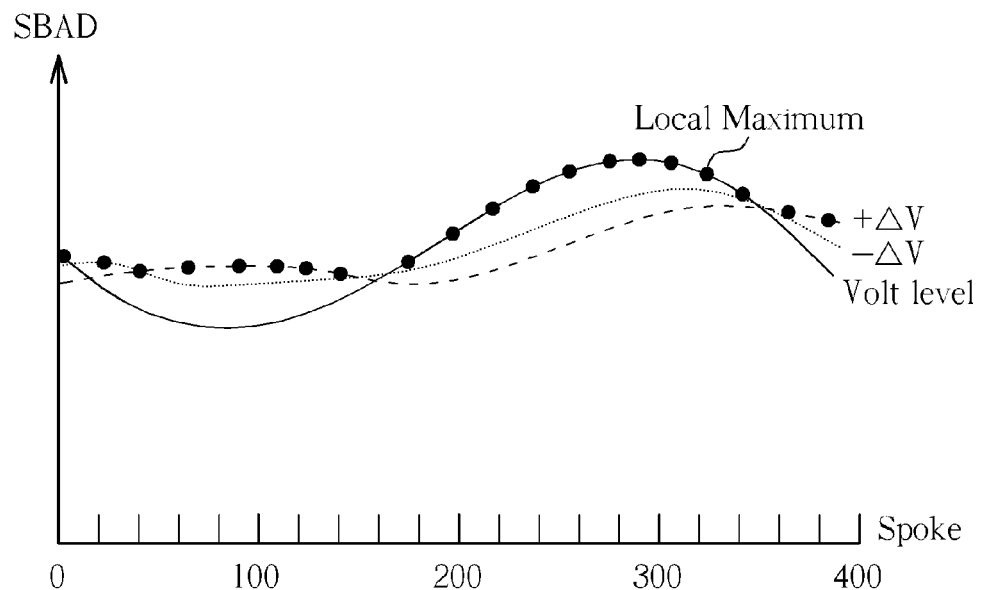
FIG. 5 is a diagram of comparing the maximum side beam added signal of each section according to an embodiment of the present invention.
Figure 6:
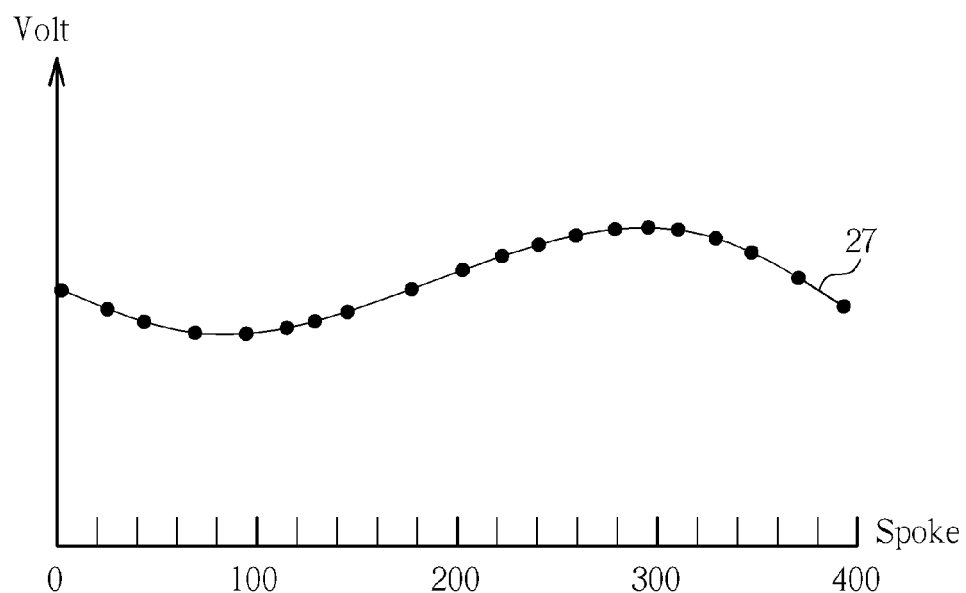
FIG. 6 is a calibrated focus volt level curve according to an embodiment of the present invention.

Compensating in a single direction to increase or decrease a volt of a predetermined value ΔV can improve the maximum SBAD of the concave part 23 or the convex part 24 in the single direction. Since the concave part 23 and the convex part 24 of the disc 20 usually occur symmetrically, utilizing bi-directional compensation can simultaneously improve and facilitate correcting of errors. Although the present invention adopts bi-directional compensation volt as an example for illustration, this is not supposed to be a limitation of the present invention, and the scope of the present invention includes single direction compensation. This is shown in FIG. 5, which is a diagram of comparing the maximum SBAD of each section according to an embodiment of the present invention. The compensated plus focus volt level curve 25 and the compensated minus focus volt level curve 26 are utilized to perform focus process on the label side, and to detect and record the SBADs. Then, the SBADs from the preliminary focus volt level curve 21, the compensated plus focus volt level curve 25 and the compensated minus focus volt level curve 26 are compared to derive the maximum SBAD in each section. As shown in FIG. 6, the volt magnitude and the spoke corresponding to the maximum SBAD in twenty sections are referred to for approximating a calibrated focus volt level curve 27 to improve the error of the preliminary focus volt level curve 21 of the deformed disc.

Figure 7:
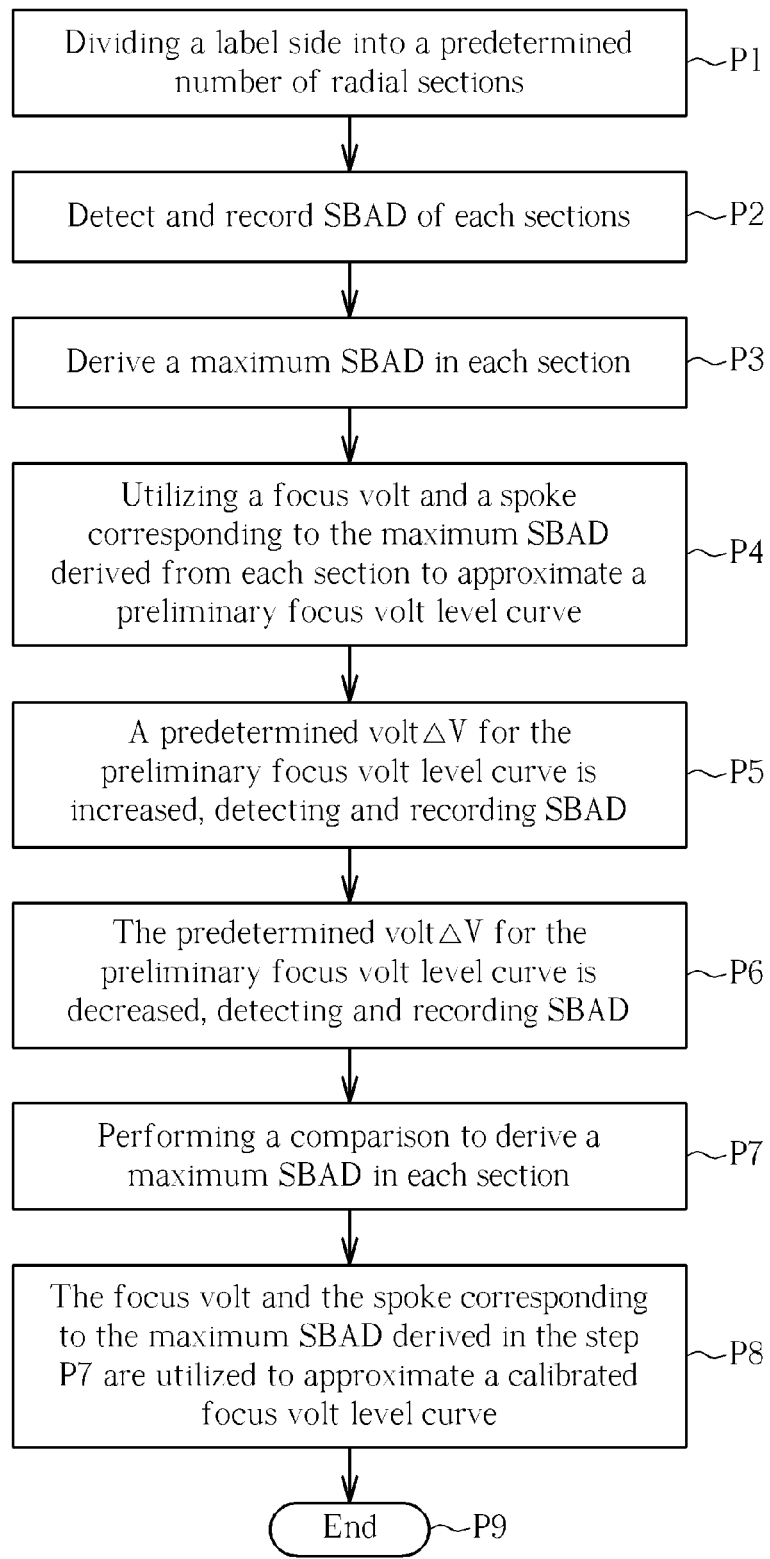
FIG. 7 is a flowchart of a method of controlling focus on a label side of a light-scribe disc according to a first embodiment of the present invention.

FIG. 7 is a flowchart of a method of controlling focus on a label side of a light-scribe disc according to a first embodiment of the present invention. The steps of increasing or decreasing a predetermined value ΔV for a focus volt level curve to improve error of a deformed disc are detailed as follows: firstly, in step P1, a label side of the light-scribe disc is divided into a predetermined number of radial sections. In step P2, focus process is performed for each section to detect and record SBADs. In step P3, derive the maximum SBAD of each section. Next in step P4, a focus volt and a spoke corresponding to the maximum SBADs derived from each section are utilized to approximate a preliminary focus volt level curve.

In step P5, a predetermined volt ΔV for the preliminary focus volt level curve is increased to form a compensated plus focus volt level curve, focus process of the label side is performed to detect and record SBADs. In step P6, the predetermined volt ΔV for the preliminary focus volt level curve is decreased to form a compensated minus focus volt level curve, and focus process of the label side is performed to detect and record SBADs. In step P7, the SBAD derived from the preliminary focus volt level curve, the SBAD derived from the compensated plus focus volt level curve and the SBAD derived from the compensated minus focus volt level curve in each section are compared to derive a maximum SBAD in each section. Then, in step P8, the focus volt and the spoke corresponding to the maximum SBAD derived in the step P7 are utilized to approximate a calibrated focus volt level curve as a focus volt level of the label side. Finally in step P9, the operation of approximating the focus volt level curve is finished.

Therefore, the method of controlling focus on a label side of a disc according to the present invention can compensate to increase or decrease a predetermined volt via a preliminary focus volt level curve to thereby form compensated plus or minus focus volt level curves, and, by comparing SBADs of the preliminary focus volt level curve with the compensated plus or minus focus volt level curves in each section, the preliminary focus volt level can be calibrated, thereby compensating focus volt level error resulted from the disc deformation. At the same time, the present invention can utilize the compensation of the error of the focus volt level curve to divide the label side of the disc into more sections, thereby deriving a more accurately approximated focus volt level to scribe a clear label pattern.

Figure 8:
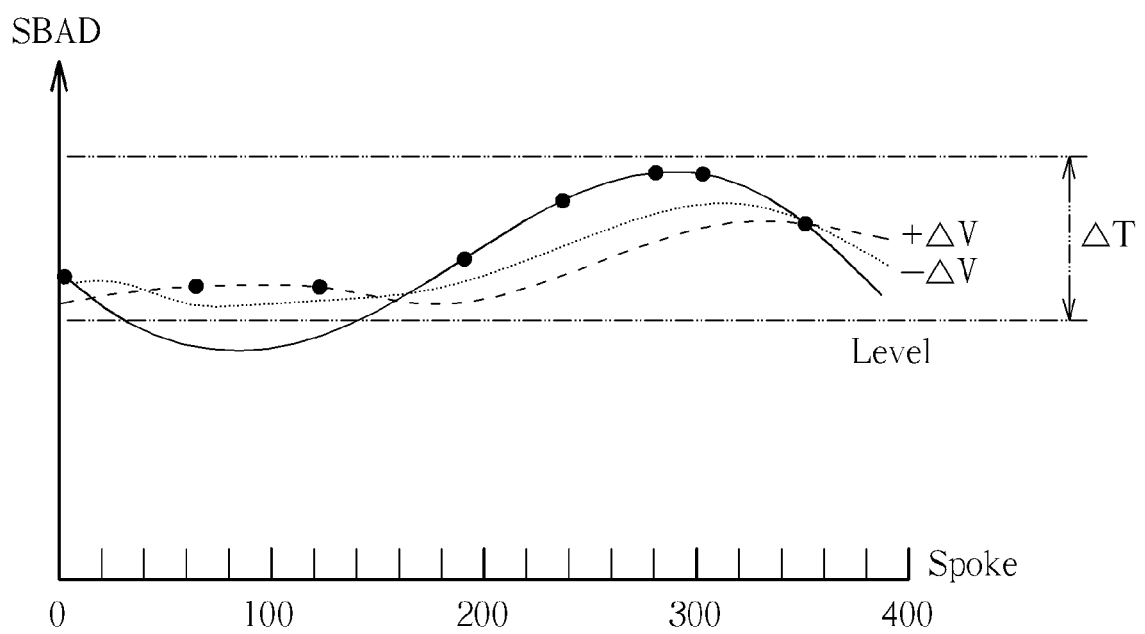
FIG. 8 is a diagram of controlling focus on the label side according to an embodiment of the present invention.

FIG. 8 is a diagram of checking differences of maximum SBADs from the method of controlling focus on the label side according to the second embodiment of the present invention. Although the reflection rate of the label side is not as good as the data side of the light-scribe disc, they are substantially the same, and therefore the maximum SBAD of each section focus aiming at the label side should also be substantially identical. An error status of the focus volt level curve can be checked via a variation of maximum SBADs of each section in the approximated focus volt level curve. The more differences between maximum SBADs of each section, the less some focus points of certain seriously deformed sections are close to the label side during the process for approximation. The exemplary embodiment sets a threshold ΔT as a threshold of checking a proper difference among maximum SBADs of sections. For those differences among maximum SBADs of sections within the threshold ΔT, the approximated focus volt level curve can be utilized to scribe clear label pattern. For those differences among maximum SBADs of sections exceeding the threshold ΔT, the approximated focus volt level curve needs to be calibrated again.

Figure 9:
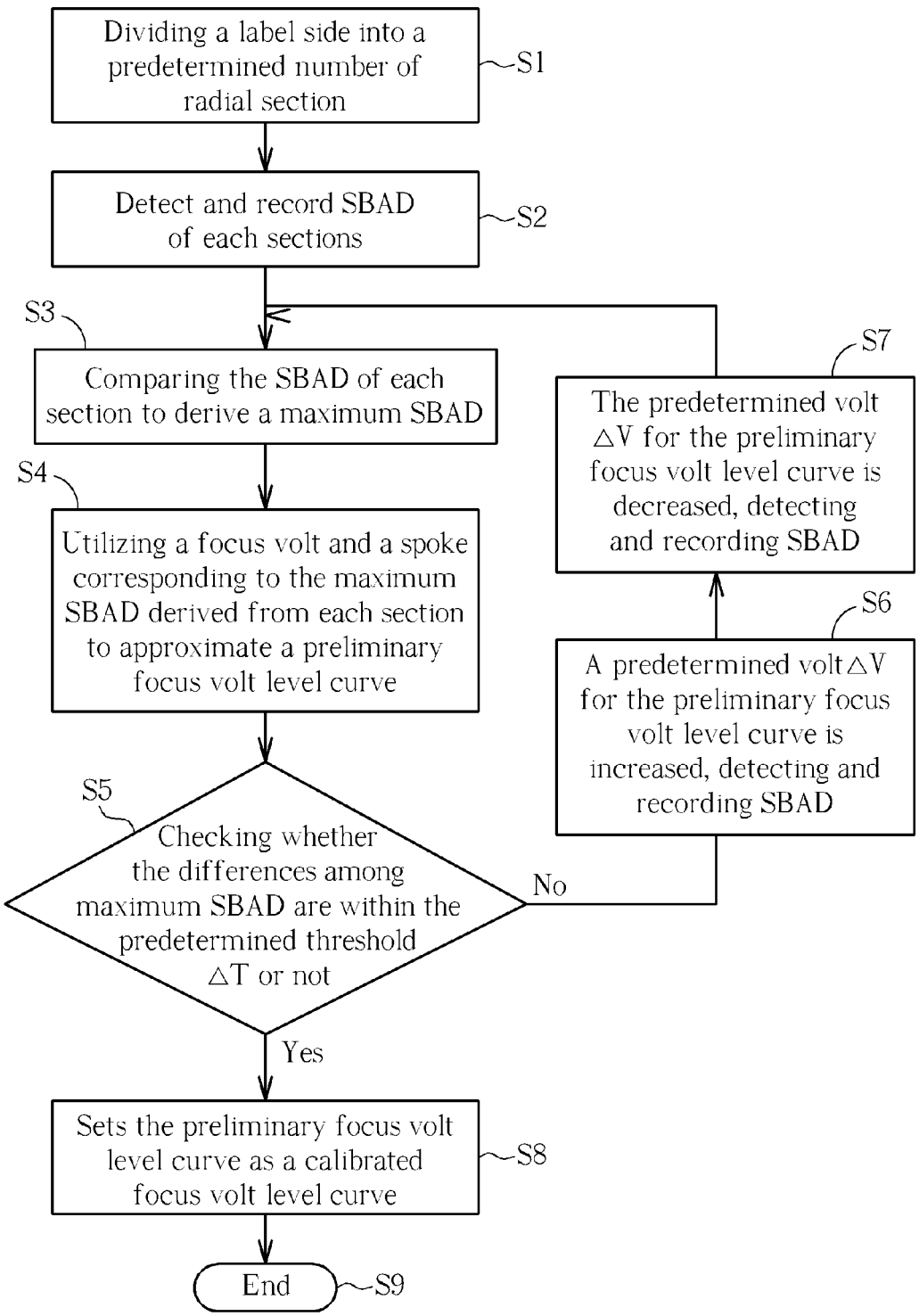
FIG. 9 is a flowchart of a method of controlling focus on a label side of a light-scribe disc according to a second embodiment of the present invention.

FIG. 9 is a flowchart of a method of controlling focus on a label side of a light-scribe disc according to the second embodiment of the present invention. The steps of checking focus volt level curve to perform calibration are detailed as follows: firstly, in step S1, a label side of the light-scribe disc is divided into a predetermined number of radial sections. In step S2, the focus process for each section is performed to detect and record SBADs. In step S3, derive the maximum SBAD of each section. Next in step S4, a focus volt and a spoke corresponding to the maximum SBADs derived from the sections are utilized to approximate a preliminary focus volt level curve.

In step S5, it is checked whether the differences among maximum SBADs are within the predetermined threshold ΔT or not. If the differences among maximum SBADs are not within the predetermined threshold ΔT, the flow goes to step S6 to increase a predetermined volt ΔV for the preliminary focus volt level curve, and utilize the compensated plus focus volt level curve to perform focus process of the label side to detect and record SBADs. In step S7, the predetermined volt ΔV for the preliminary focus volt level curve is decreased, and the compensated minus focus volt level curve is utilized to perform focus process of the label side to detect and record SBADs. Then, the flow goes back to step S3 to compare the SBAD derived from the preliminary focus volt level curve, the SBAD derived from the compensated plus focus volt level curve and the SBAD derived from the compensated minus focus volt level curve in each section to derive a maximum SBAD in each section. If the differences among maximum SBADs are within the predetermined threshold ΔT, the flow goes to step S8, and sets the preliminary focus volt level curve in step S4 as a calibrated focus volt level curve. Finally in step S9, the calibration of the focus volt level curve is finished.

Figure 10:
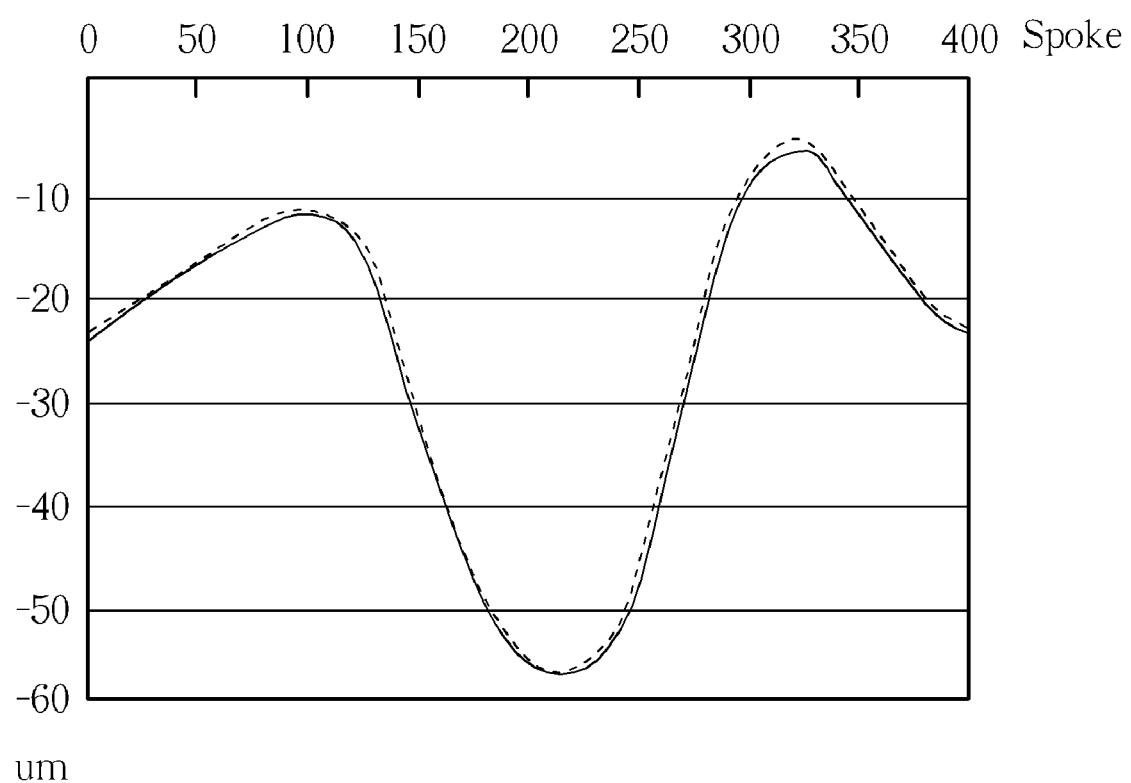
FIG. 10 is a diagram of focus controlling method on the label side according to an embodiment of the present invention.

FIG. 10 is a diagram of focus controlling method on the label side forming a focus volt level curve for a deformed disc according to an embodiment of the present invention. The solid line in FIG. 10 is a focus volt level curve for moving the pickup head on the label side, and the dotted line is the approximated focus volt level curve for moving the pickup head according to an embodiment of the present invention. Via measurement, the maximum error between those two curves is 1.3 μm. Therefore, the present invention is able to significantly lower the maximum error, i.e., 2.8 μm, resulting from the preliminary focus volt level curve, such that the focus on the label side can be greatly improved.

Therefore, the method of controlling focus on a label side of a disc according to the second embodiment of the present invention can utilize a threshold to check a maximum difference between SBADs of focus volt level curves to determine a proper focus volt level for the label side, and hence improve an efficiency of calibrating the focus volt level.

Those skilled in the art will readily observe that numerous modifications and alterations of the device and method may be made while retaining the teachings of the invention.

What is claimed is:

1. A method of controlling focus on a label side of a light-scribe disc, comprising:
   (1) dividing a label side of the light-scribe disc into a predetermined number of sections;
   (2) performing focus process for each section to detect and record a side beam added signal (SBAD);
   (3) comparing the SBADs of each section to derive a maximum SBAD;
   (4) utilizing a focus volt and a spoke corresponding to the maximum SBAD derived from each section to approximate a preliminary focus volt level curve;
   (5) compensating a predetermined volt for the preliminary focus volt level curve to form a compensated focus volt level curve, and performing focus process of the label side to detect and record SBADs;

(6) comparing the SBAD derived from the preliminary focus volt level curve and the SBAD derived from the compensated focus volt level curve in each section; and (7) utilizing the focus volt and the spoke corresponding to the maximum SBAD derived in step (6) to approximate a calibrated focus volt level curve.

2. The method of claim 1, wherein the label side of the light-scribe disc is divided into twenty sections.

3. The method of claim 1, wherein the step of compensating a predetermined volt for the preliminary focus volt level curve comprises increasing a predetermined volt value.

4. The method of claim 1, wherein the step of compensating a predetermined volt for the preliminary focus volt level curve comprises decreasing a predetermined volt value.

5. The method of claim 1, wherein the step of compensating a predetermined volt for the preliminary focus volt level curve comprises increasing and decreasing a predetermined volt value, respectively.

6. The method of claim 1, wherein the compensated focus volt level curve is utilized as a focus volt level of the label side.

7. A method of controlling focus on a label side of a light-scribe disc, comprising:

(1) dividing a label side of the light-scribe disc into a predetermined number of sections;

(2) performing focus process for each section to detect and record a side beam added signal (SBAD);

(3) comparing the SBADs of each section to derive a maximum SBAD;

(4) utilizing a focus volt and a spoke corresponding to the maximum SBAD derived from each section to approximate a preliminary focus volt level curve;

(5) checking whether a difference of maximum SBAD between each section is within a threshold, where when the difference is within the threshold, going to step (7); otherwise, going to step (6);

(6) compensating a predetermined volt for the preliminary focus volt level curve to forma compensated focus volt level curve, and performing focus process of the label side to detect and record a SBAD and back to step (3);

(7) setting the preliminary focus volt level curve in step (4) as a calibrated focus volt level curve; and (8) ending calibrating the focus volt level curve.

8. The method of claim 7, wherein the label side of the light-scribe disc is divided into twenty sections.

9. The method of claim 7, wherein the step of compensating a predetermined volt for the preliminary focus volt level curve comprises increasing a predetermined volt value.

10. The method of claim 7, wherein the step of compensating a predetermined volt for the preliminary focus volt level curve comprises decreasing a predetermined volt value.

11. The method of claim 7, wherein the step of compensating a predetermined volt for the preliminary focus volt level curve comprises increasing and decreasing a predetermined volt value, respectively.

12. The method of claim 7, wherein the compensated focus volt level curve is utilized as a focus volt level of the label side.

13. The method of claim 7, wherein step (6) comprises comparing the SBAD derived from the preliminary focus volt level curve and the SBAD derived from the compensated focus volt level curve in each section and back to step (3) to derive the maximum SBAD in each section.

* * * * *